Patented Jan. 14, 1936

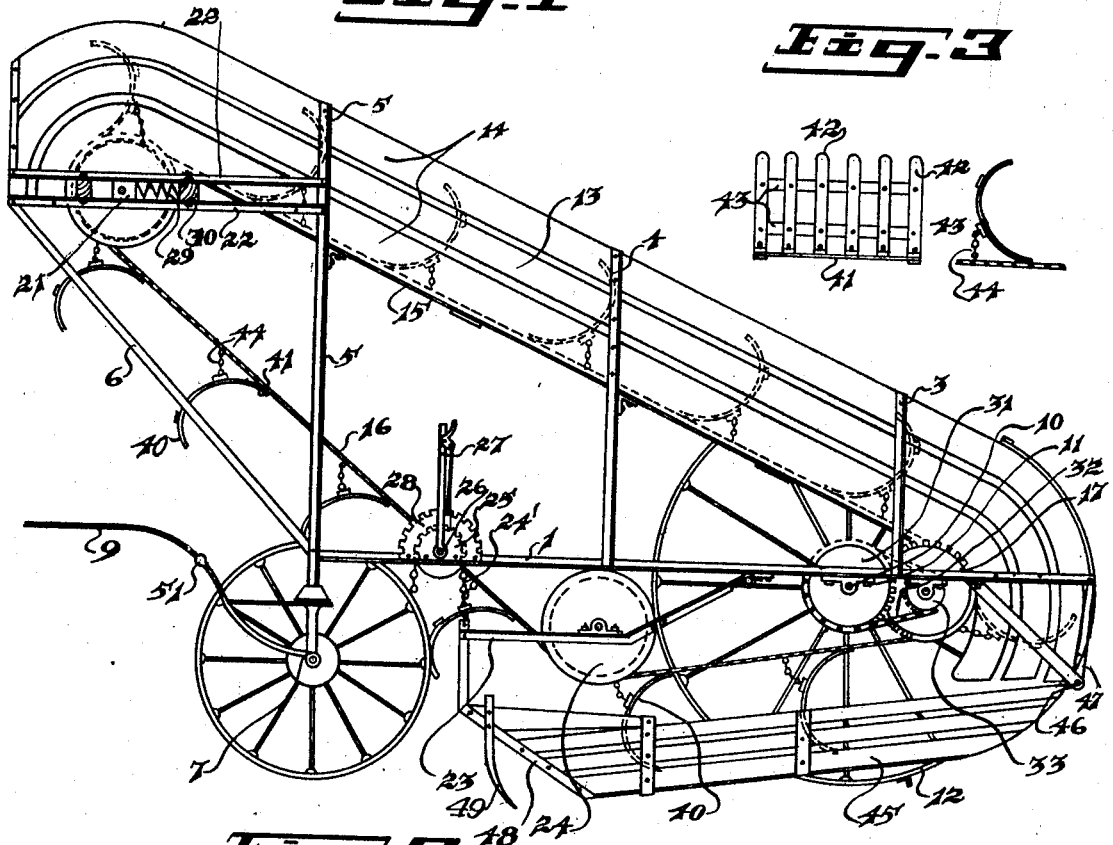

2,027,479

UNITED STATES PATENT OFFICE 2,027,479

ROOT HARVESTING MACHINE

Georg Hendel, Baden, Ontario, Canada

Application January 11, 1935, Serial No. 1,301
In Canada January 13, 1934

8 Claims. (Cl. 55—138)

My invention relates to root harvesting machines. more particularly having reference to devices combining harvesting and loading elements.

One of the objects of my invention is to provide a machine for harvesting roots and similar field products operative to dislodge roots from the ground and by a conveyor system, operating on an inclined plane, to transfer said roots into a load receiving receptacle. In particular the conveyor system combines conveying and engaging elements, and by a combination of chutes operating in opposite inclined planes disposed in co-operating relationship, is effective to dislodge and collect the roots and discharge said roots forwardly of the machine. One of said chutes is adapted for co-operation with the root engaging elements and operates in working relationship with the ground.

A particular feature of my invention involves use of an improved mounting for the root engaging elements effective to prevent forward gravitation of the elements during the discharging operation, ensuring a clean discharge of the roots. In addition I provide digging elements operating to loosen the soil preliminary to engagement of the roots by the conveyor. Other features of my invention include means for elevating the various elements involved in the digging operations out of working relationship with the ground during transport of the machine; a resilient mounting for the conveyor; and improved root-engaging elements.

Other objects of my invention will become apparent from the accompanying description taken in conjunction with the drawing wherein like characters of reference indicate like parts throughout the different views and wherein:

Fig. 1 is a side elevation of the machine illustrated with certain parts removed to more effectively disclose the working elements.

Fig. 2 is an inverted plan view of the machine, shown partly broken away.

Fig. 3 is a detail view of a root engaging element.

My improved harvester is adapted for travel attached behind a wagon, or similar vehicle embodying a root carrying receptacle, into which roots are discharged from the harvester. Having reference to the drawing, the harvester includes a frame composed of a series of parts rigidly secured into a unitary structure and supported on traction wheels. The said structure includes longitudinal side bars 1 and 2 on each of which are mounted, in opposite relationship, vertical standards as indicated at 3, 4 and 5, and inclined standards as indicated at 6. The standards 5 extend below the side bars 1 and 2, and provide a mounting for an axle 7 on which are rotatable front wheels 8—8. A draft connection, generally indicated at 9, and including a hinged joint 51, is provided for attachment to the vehicle in conjunction with which the harvester is to operate.

Rearwardly the frame structure is supported on rotatable elements which comprise an axle 10 journalled in suitable bearings, as indicated at 11—11, mounted on the side bars 1 and 2, and wheels 12—12 on said axle.

Mounted in the frame structure, supported on the vertical and inclined standards, is a main chute 13, which may be constructed in any suitable manner, but in the present showing includes sides constructed of spaced slats 14, and an intermediate bottom portion formed of similar spaced slats 15, or of board construction.

Mounted for travel through the chute 13 is a conveyor formed of a pair of endless chains 16—16 trained over sprockets as hereinafter described. Rearwardly the chains 16—16 travel on sprockets 17 on a drum 18, said drum being secured on a suitable shaft rotatably mounted in suitable bearings carried by the side bars 1 and 2. Forwardly the said chains are trained over sprockets 19 on a drum 20 said drum being mounted with opposite ends rotatable in bearing blocks, such as indicated at 21. Each of the bearing blocks 21 is horizontally slidable between spaced bars, such as indicated at 22—22 (see Fig. 1), attached to the vertical standards 5 and inclined standards 6.

Pivotally suspended from the side bars 1 and 2 are angular brackets 23 having rotatably supported thereon an idler drum 24 bearing downward against the conveyor. The free ends of the brackets 23 are supported by chains 24' carried over sprocket wheels 25 fixed on a shaft 26 rotatably carried on the side bars 1 and 2. Said shaft 26 is provided with a lever 27 with latch mechanism to cooperate with a holding segment 28. For taking up the slack in the conveyor chains when the idler drum is elevated, springs 29 are provided attached to blocks 30 secured between the bars 22—22 and bearing against the bearing blocks 21 to normally move said bearing blocks outward and increase the spacing between the drums 20 and 18.

Means for driving the conveyor consist of a sprocket wheel 31 loose on the axle 10 and operatively connected by a chain 32 to a sprocket pinion 33 on the shaft of the drum 18. Operative connection between the sprocket wheel 31 and axle 10 is obtained through a jaw clutch member 34 keyed to slide on said axle and engage a complementary jaw member 35 on the sprocket wheel 31. For manipulation of the clutch member 34 a lever 36 is provided having a forked engagement on the clutch member 34. Said lever is intermediately pivoted on a bracket 37 secured to the side bar 1. On said side bar 1 is a laterally extending bracket 38 provided with openings, one of which is indicated at 39, said openings being adapted for engagement of a pin or suitable connecting medium which would be provided on the level 36 permitting securing said lever with the clutch members engaged or disengaged as desired.

At intervals on the conveyor are the root engaging elements, generally indicated at 40. Each of said elements consists of a bar 41 transversely disposed and secured to the chains 16—16. To the bar 41 are attached spaced prongs 42 secured in spaced relation to each other by cross bars 43. In order to ensure free discharge of roots from the engaging elements during travel over the drum 20 and eliminate carrying the roots onward, more particularly from gravitation of the engaging elements during passage over the drum, the said elements are secured by connecting chains 44 to the side chains 16—16 said chains 44 being arranged to prevent forward movement of said elements beyond a substantially vertical position relative to said side chains.

For collecting the roots from the ground and transferring them to the main chute in co-operation with the conveyor, an auxiliary chute 45 is provided pivotally supported at one end on a rod 46 carried by brackets 47 secured to the main frame bars 1 and 2. The said chute 45 is forwardly pivotally supported from the angular brackets 23 and chains 24' by an end piece or bracket 48 which is of an intermediate curved formation forming the chute 45 as a scoop like structure adapted to be engaged in penetrating relationship with the ground for reception of the roots. For loosening the soil and initial disengagement of the roots from the ground co-operating soil working knives 49 and 50 are provided secured to the end piece 48.

In the operation of the machine the device is drawn behind a vehicle adapted for reception of the roots. The angular brackets 23 are lowered bringing the digging knives 49 and 50, the auxiliary chute 45 and engaging elements 40 of the conveyor into operative relationship with the ground. The roots are loosened by the knives 49 and 50 and carried along the auxiliary chute by the root engaging elements 40 and then upward through the chute 13 to be discharged into the preceding vehicle. Loose dirt from the roots would be dislodged in passage through the chute, particularly as a result of the vibration to which the machine would be subjected. The auxiliary chute 45 is designed to operate with its receiving end in penetrating relationship with the ground.

By drawing forward on the lever 27 the working elements can be raised out of operative position, the springs 29 serving to take up the slack in the conveyor chains 16—16.

While I have shown a particular form of embodiment of my invention, it is obvious that many minor changes therein will readily suggest themselves to others skilled in the art without departing from the spirit and scope of the invention, and I therefore desire to avoid being limited to the exact form shown and described.

What I claim is:

1. A root harvester including main and auxiliary chutes in inclined co-operating relationship, the auxiliary chute having a receiving end operative in working relationship with the ground, an endless conveyor mounted for travel through the main chute, a plurality of root engaging elements at intervals on the conveyor, said conveyor being arranged to bring the root engaging elements into working relationship with the ground and the auxiliary chute, soil working knives carried by the auxiliary chute and located in advance of the receiving end thereof, means for effecting adjustment of the conveyor and auxiliary chute relative to their working relationship with the ground, and means for driving the conveyor, said means being operative from the traction of the harvester as a source of power.

2. A root harvester comprising a frame formed of a series of parts rigidly secured into a unitary structure, supporting wheels for the frame, a main chute carried by the frame, said chute having its delivery end forwardly located, an auxiliary chute pivotally supported from the main chute, an endless conveyor mounted for travel through the main chute, root engaging elements at intervals on said conveyor, an idler drum carried by the auxiliary chute over which the conveyor is constrained to travel to bring the root engaging elements into working relationship with the ground and the auxiliary chute, means, including a lever and quadrant, for raising and lowering the auxiliary chute, and means for driving the conveyor, said means being operative from the supporting wheels as a source of power.

3. A root harvester comprising a frame, supporting wheels for the frame, a main inclined chute carried by the frame, an auxiliary chute pivotally supported from the main chute, said auxiliary chute having a receiving end operative in working relationship with the ground, an endless conveyor mounted for travel through the main chute, means associated with the conveyor mounting for eliminating slack therein, root engaging elements at intervals on said conveyor, an idler drum associated with the auxiliary chute and arranged to divert the conveyor to bring the root engaging elements into working relationship with the ground and the auxiliary chute, soil working elements carried by the auxiliary chute and located in advance thereof, means for raising and lowering the receiving end of the auxiliary chute including the associated idler drum, and means for driving the conveyor, said means being operative from the supporting wheels as a source of power.

4. A root harvester including main and auxiliary chutes in inclined co-operating relationship, the auxiliary chute being mounted to be vertically shiftable in and out of working relationship with the ground, an endless conveyer mounted for travel through the main chute, said conveyer including a plurality of root engaging elements, and a drum carried by the auxiliary chute over which the conveyer is constrained to travel to bring the root engaging elements into co-operating relationship with the auxiliary chute.

5. A root harvester including a frame structure, main and auxiliary chutes mounted in the frame structure in inclined co-operating relationship, the auxiliary chute being mounted to be vertically shiftable in and out of working relationship with the ground, an endless conveyer mounted for travel through the main chute, said conveyer including a plurality of root engaging elements, the mounting for said conveyer including drums at either end of the main chute, the one of said drums being relatively shiftable to take up slack in the conveyer, and an idler drum carried by the auxiliary chute over which the conveyer is constrained to travel to bring the root engaging elements into co-operating relationship with the auxiliary chute.

6. A device as defined in claim 5 including spring means tensioned to be automatically effective to move the shiftable drum and take up slack occurring in the conveyer.

7. A root harvester including a frame structure, main and auxiliary chutes mounted in the frame structure in inclined co-operating relationship, the delivery end of the auxiliary chute being pivotally supported, an endless conveyer mounted for travel through the main chute, said conveyer including a plurality of root engaging elements, an idler drum carried by the auxiliary chute over which the conveyer is constrained to travel to bring the root engaging elements into co-operation with said auxiliary chute, means for forwardly suspending the auxiliary chute, said means including a lever with latch mechanism and quadrant by which said chute may be secured at selected positions of vertical adjustment, and means for taking up slack in the conveyer.

8. In a root harvester including a chute having a receiving end adapted for operation in working relation with the ground, soil working elements located in advance of the receiving end of said chute, said elements being in the form of knives having blade members extending transversely relative to said chute.

GEORG HENDEL.